(12) United States Patent
Ioppolo

(10) Patent No.: US 10,562,422 B2
(45) Date of Patent: Feb. 18, 2020

(54) VEHICLE SEAT

(71) Applicant: Brose Fahrzeugteile GmbH & Co. KG, Coburg, Coburg (DE)

(72) Inventor: Leo Ioppolo, Washington, MI (US)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 357 days.

(21) Appl. No.: 15/427,717

(22) Filed: Feb. 8, 2017

(65) Prior Publication Data

US 2018/0222351 A1 Aug. 9, 2018

(51) Int. Cl.
*B60N 2/42* (2006.01)
*B60N 2/68* (2006.01)

(52) U.S. Cl.
CPC ........... *B60N 2/682* (2013.01); *B60N 2/4221* (2013.01); *B60N 2205/20* (2013.01)

(58) Field of Classification Search
CPC ........ B60N 2/062; B60N 2/20; B60N 2/4221; B60N 2/68; B60N 2/682; B60N 2002/0216; B60N 2205/20
See application file for complete search history.

(56) References Cited

U.S. PATENT DOCUMENTS

| | | | |
|---|---|---|---|
| 5,690,459 A | 11/1997 | Donovan et al. | |
| 6,077,014 A | 6/2000 | Gulistan | |
| 6,517,157 B1 | 2/2003 | Vorac | |
| 6,698,081 B2 | 3/2004 | Oates et al. | |
| 7,316,454 B2 | 1/2008 | Yoshida | |
| 8,172,326 B2 | 5/2012 | Adragna et al. | |
| 8,322,675 B2 * | 12/2012 | Ducreuzot | B60N 2/1615 248/424 |
| 8,894,143 B2 | 11/2014 | Schüler et al. | |
| 9,045,061 B2 | 6/2015 | Kostin et al. | |
| 9,126,518 B2 | 9/2015 | Adragna et al. | |
| 9,248,763 B2 * | 2/2016 | Paluch | B60N 2/1615 |
| 2004/0135411 A1 * | 7/2004 | Hensley | B60N 2/06 297/313 |
| 2006/0261625 A1 | 11/2006 | Kröner | |
| 2008/0307624 A1 | 12/2008 | Lee | |
| 2009/0001751 A1 * | 1/2009 | Doxey | B60N 2/224 296/65.16 |

(Continued)

FOREIGN PATENT DOCUMENTS

| | | |
|---|---|---|
| DE | 197 27 310 A1 | 1/1999 |
| DE | 100 34 441 A1 | 1/2002 |
| DE | 103 10 018 A1 | 9/2004 |

(Continued)

*Primary Examiner* — Ryan D Kwiecinski
(74) *Attorney, Agent, or Firm* — Lewis Roca Rothgerber Christie LLP

(57) ABSTRACT

A vehicle seat comprises a seat part including a seat cushion pan 1 for a seat occupant, two side parts between which a cross tube 6 extends along a pivot axis, and seat part mounting brackets 7 for connecting the seat cushion pan 1 and the cross tube 6. The cross tube 6 has a clearance opening 61 within the range of at least one of the seat part mounting brackets 7 and a local bead 62 opposite from the clearance opening 61. The local bead 62 engages an indentation or slot 72 within the surface of the seat part mounting bracket 7 facing the cross tube 6 for limiting a lateral movement of the seat cushion pan 1.

12 Claims, 6 Drawing Sheets

(56) References Cited

U.S. PATENT DOCUMENTS

2017/0305303 A1 * 10/2017 Yadav .................. H01R 13/73

FOREIGN PATENT DOCUMENTS

| | | |
|---|---|---|
| DE | 20 2005 009 185 U1 | 10/2006 |
| DE | 10 2010 042 888 A1 | 4/2012 |
| DE | 102012020032 A1 * | 4/2014 |
| DE | 10 2013 001 416 A1 | 7/2014 |
| DE | 10 2013 209 948 A1 | 12/2014 |
| DE | 10 2014 202 086 B3 | 2/2015 |
| DE | 10 2013 112 462 A1 | 5/2015 |
| EP | 0 383 123 A2 | 8/1990 |
| EP | 0 844 939 B1 | 12/1998 |
| EP | 1 820 579 A1 | 8/2007 |
| EP | 2 027 951 A1 | 2/2009 |
| EP | 2955055 A1 * | 12/2015 |

* cited by examiner

VEHICLE SEAT

TECHNICAL FIELD

The present invention relates to a vehicle seat, in particular to an assembly group of an adjustment mechanism of a seat part comprising a cushion pan for a seat occupant.

BACKGROUND

FIG. 1 shows a perspective front view and FIG. 2 a schematic view of a section of a height adjustable seat part of a vehicle seat according to the prior art comprising a seat cushion pan 1, a first side part 21 and a second side part 22 forming a seat frame, wherein a front cross tube 3 and a rear cross tube (not shown) extend there between. The front cross tube 3 is mounted pivotably to the side parts 21, 22 and carries the seat cushion pan 1 by means of seat part mounting brackets 4, 5.

Since the seat cushion pan 1 must pass a lateral durability requirement in which the seat cushion pan 1 must not exhibit too much free play in the transverse direction of a car, i.e. the Y-direction of the Cartesian Car Coordinate System or in axial direction of the front cross tube 3, at least one annular bead 30 is formed on the cylindrical outer surface of the front cross tube 3 according to FIG. 3 showing an enlarged schematic view of detail III according to FIG. 2. The annular bead 30 interacts with ribs 40 on the seat part mounting bracket 4, in particular with a annular groove 41 between the ribs 40, thus limiting the lateral free play and accordingly the lateral movement of the seat cushion pan 1.

A method for forming a annular bead on the cylindrical outer surface of a cross tube is known from US 2010/0219319 A1 by placing the cross tube into first and second holders facing each other and leaving an expansion space between them into which a part of the cross tube extends. Then the holders are moved closer to each other so as to compress the cross tube and cause radial deformation of the cross tube into the expansion space. As the cross tube is compressed by the advancing holders, the part of the tube in the expansion space bulges then is flattened to form a annular fold or bead.

However, the bead forming specified above creates a change in the material grain structure and thus a weak zone in the material of the cross tube. Moreover, while forming the bead the material is work hardened thus increasing the brittleness of the cross tube material. The annular bead also creates an inherent bending line directly in the load path bending plane. During a frontal impact of a Stiff Structure with the fixed cross tube it could happen that the above mentioned limitations of the annular bead will cause a fracture or split along the annular bead resulting in an unacceptable forward displacement of the occupant and/or harm to the occupant.

SUMMARY OF THE INVENTION

It is an object of the present invention to limit the lateral free play and thus to limit a lateral displacement of the seat cushion pan without a change in the material grain structure and a weakening of the cross tube material.

It is an additional object of the present invention to provide an improved energy transfer by transmitting energy to the normal bending area of the cross tube to create a more controlled bending or displacement of the cross tube in particular in case of a frontal impact of a car.

It is a further object of the present invention to provide a simplified assembly of the seat.

In a first aspect, a vehicle seat comprises a seat part comprising a seat cushion pan for a seat occupant and two side parts between which a cross tube extends along a pivot axis, seat part mounting brackets for connecting said seat cushion pan and said cross tube, said cross tube having a clearance opening within the range of at least one of said seat part mounting brackets and a local bead opposite from said clearance opening, said local bead cooperating with a positive locking means of said seat part mounting bracket for limiting a lateral movement of said seat cushion pan.

The arrangement of a local bead engaging a positive locking means of said seat part mounting bracket rather than a annular bead on the cylindrical outer surface of the cross tube limits the lateral free play and thus a lateral displacement of the seat cushion pan without a change in the material grain structure and a weakening of the cross tube material which potentially results in a cross tube fracture and thus in a forward displacement of a seat occupant in particular in case of a frontal impact of a car. Moreover, the present invention provides an improved energy transfer by transmitting energy to the normal bending area of the cross tube to create a more controlled bending or displacement of the cross tube.

To provide access to a tool to the inner surface of the cross tube to create a cam-like embossment radially expanding from the substantially cylindrical surface of said cross tube as a local bead on top of the cross tube with respect to the vertical direction of a car (Z-direction of the Cartesian car coordinate system) a clearance opening is formed as a hole or slot punched into the bottom of said cross tube opposite from the location of the local bead and within the range of at least one of said seat part mounting brackets.

In one aspect, the local bead engages an indentation or slot within the surface of said seat part mounting bracket facing said cross tube.

In another aspect the cross tube has clearance openings within the range of said seat part mounting brackets being separated from each other in a predetermined distance and local beads opposite from said clearance openings, said local beads abutting the inner edges of said seat part mounting brackets facing each other.

Alternatively the cross tube has clearance openings within the range of said seat part mounting brackets being separated from each other in a predetermined distance and local beads opposite from said clearance openings, said local beads abutting the outer edges of said seat part mounting brackets being oriented to said side parts of said seat part.

Both variants provide a simplified structure of the seat part mounting bracket the positive locking means of which for cooperating with the local bead is either a simple indentation or slot within the surface of the seat part mounting bracket or provided by the inner or outer edges of the seat part mounting brackets being oriented to each other or the side parts of the seat part assembly of the seat.

In a second embodiment of the present invention the location of arranging the cam-like embossment on one side engaging a positive locking means on the other side is exchanged by providing the cross tube with a mounting opening within the range of at least one of the seat part mounting brackets, which are provided with a cam-like embossment radially expanding from the inner surface of the seat part mounting bracket facing the mounting opening of the cross tube.

Alternatively the mounting opening is formed as a hole or slot punched into the top side of the cross tube with respect to the vertical direction of a car (Z-direction of the Cartesian car coordinate system) and the seat part mounting bracket within the range of said mounting opening is provided with a cam-like embossment expanding from the lower surface of the mounting part of the seat part mounting bracket facing the mounting opening of the cross tube.

The above identified solutions limit the lateral free play and thus a lateral displacement of the seat cushion pan without a change in the material grain structure and a weakening of the cross tube material and provide an improved energy transfer by transmitting energy to the normal bending area of the cross tube to create a more controlled bending or displacement of the cross tube in particular in case of a frontal impact of a car.

Last not least the solutions provide a simplified assembly of the seat by simplifying the positive locking elements at the cross tube and the seat cushion pan for mounting the seat cushion pan to the cross tube.

BRIEF DESCRIPTION OF THE DRAWINGS

The various features and advantages of the present invention may be more readily understood with reference to the following detailed description and the embodiments shown in the drawings. Herein shows FIG. 1 a perspective front view of a section of a height adjustable seat part of a vehicle seat according to the prior art.

DETAILED DESCRIPTION

Figure 1:
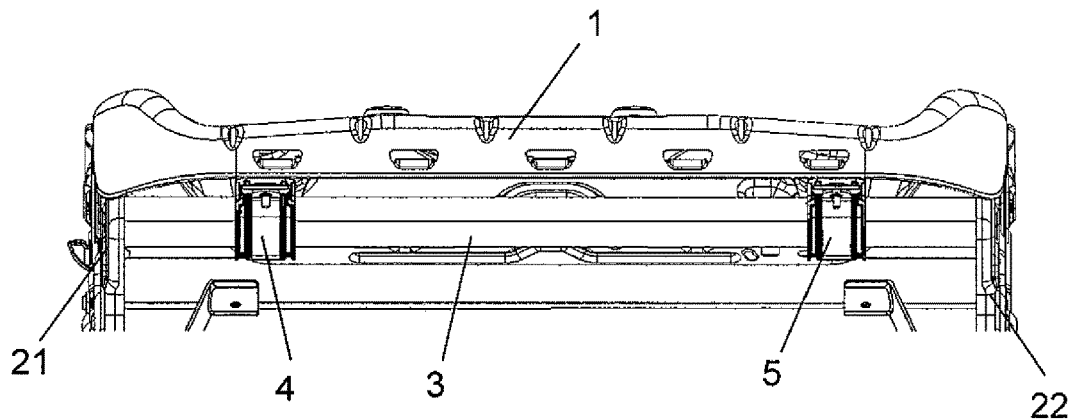

Subsequently, embodiments of the invention shall be described in detail with reference to the drawings. In the drawings, like reference numerals designate like structural elements.

It is to be noted that the embodiments are not limiting for the invention, but merely represent illustrative examples.

Figure 2:
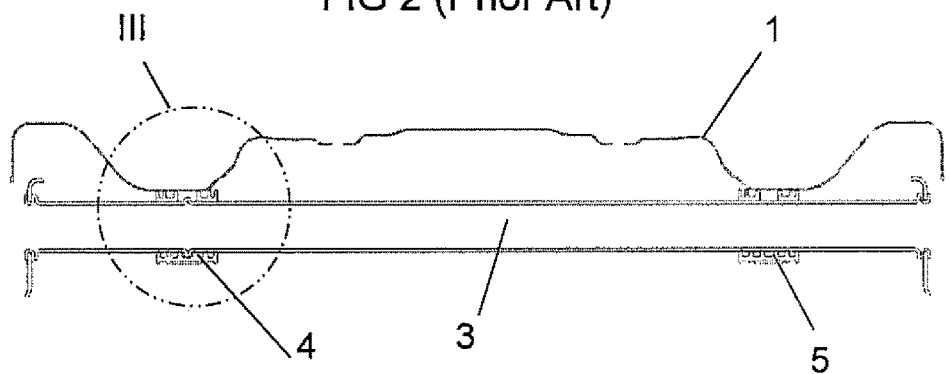
FIG. 2 a cross-sectional view of the connection between a front cross tube and a seat cushion pan according to FIG. 1.
Figure 3:
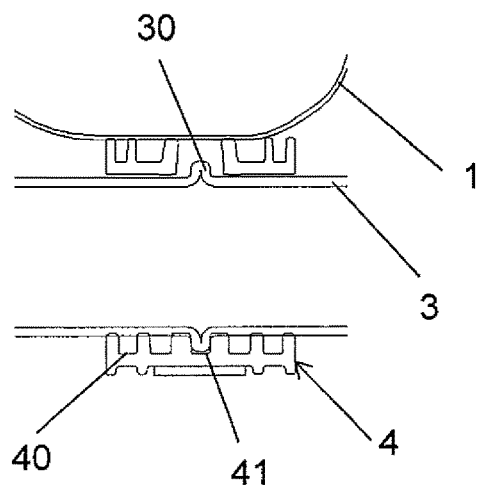
FIG. 3 an enlarged view of the detail III represented in FIG. 2 of the connection between a annular bead of the front cross tube and a annular groove of a seat part mounting bracket FIG. 4 a perspective view of the annular bead of the front cross tube of FIGS. 2 and 3.
Figure 4:
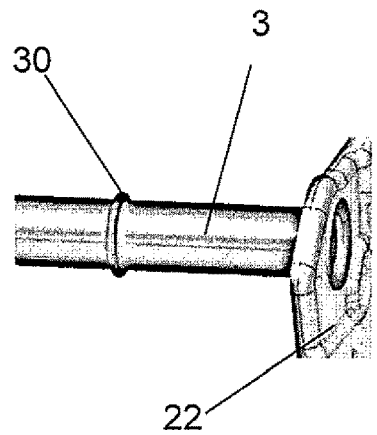
Figure 5:
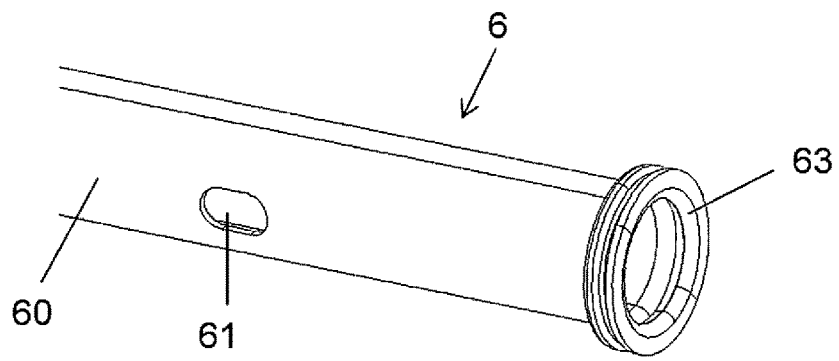
FIG. 5 a perspective view of a cross tube comprising a clearance opening to provide access to a tool to create a local bead opposite from the clearance opening according to the present invention.

FIG. 5 shows a perspective partial view of a cross tube 6 which is part of a seat part of a vehicle seat comprising a seat cushion pan for a seat occupant and two side parts between which a cross tube extends along a pivot axis as shown in FIGS. 1 and 2. The axial end of the hollow-cylindrical main section 60 of the cross tube 6 comprises two annular stops 63 which extend out radially relative to the axis of the cross tube 6, spaced apart from each other along the axis of the cross tube 6 delimiting between them a fitting portion for receiving a rotatable link (not shown) of a seat adjustment mechanism.

Figure 6:
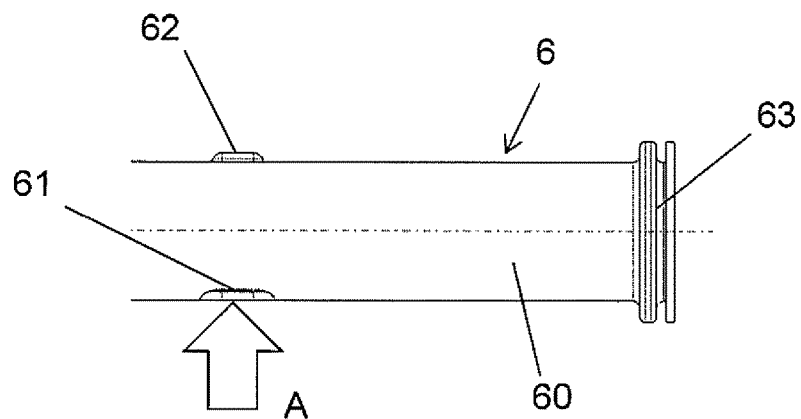
FIG. 6 a side-view of the cross tube according to FIG. 5 comprising a local bead opposite from the clearance opening.

A slot-like clearance opening 61 is punched in the bottom of the cross tube 6 in the vertical direction or "Z"-direction of the Cartesian car coordinate system. According to the partial side-view of the cross tube 6 in FIG. 6 the clearance opening 61 provides access to a tool in the direction of arrow A to create a local bead 62 in the form of a cam-like embossment radially expanding from the hollow-cylindrical main section 60 at the opposite side on top of the hollow-cylindrical main section 60 of the cross tube 6 with respect to the vertical direction or "Z"-direction of the Cartesian car coordinate system.

Figure 7:
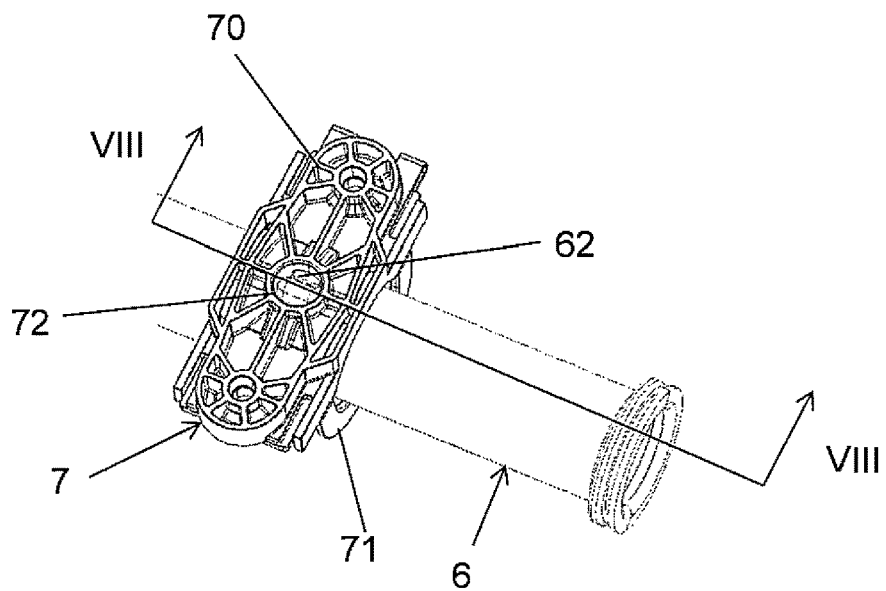
FIG. 7 a perspective view of a connection between the local bead of the cross tube and a seat cushion pan by means of a seat part mounting bracket.
Figure 8:
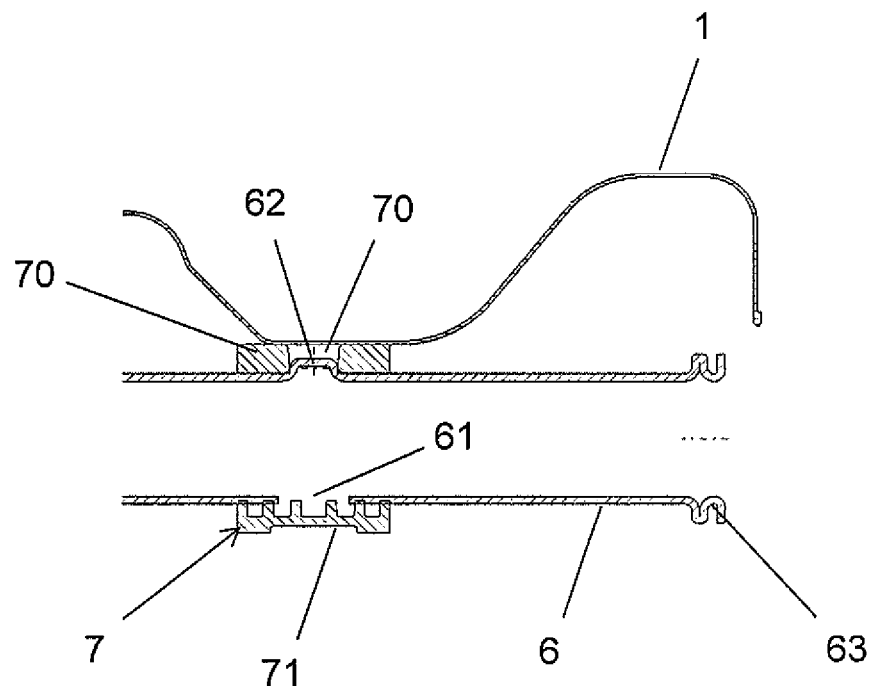
FIG. 8 a cross-sectional view, in the direction referenced VIII-VIII in FIG. 7.

The local bead 62 is one part of a positive locking retaining feature the second part of which is an indentation or slot 72 in a mounting part 70 of a seat part mounting bracket 7 shown in a perspective view of the connection between the local bead 62 of the cross tube 6 and a seat part mounting bracket 7 according to FIG. 7. The indentation or slot 72 in the mounting part 70 of the seat part mounting bracket 7 faces the local bead 62 of the cross tube 6 as shown in the cross-sectional view of FIG. 8, in the direction referenced VIII-VIII in FIG. 7. A tube enveloping part 71 of the seat part mounting bracket 7 covers the remaining part of the hollow-cylindrical main section 60 of the cross tube 6 and thus the clearance opening 61 of the cross tube 6 providing access to a tool to create the local bead 62.

The local bead 62 of the cross tube 6 and the indentation or slot 72 in the mounting part 70 of the seat part mounting bracket 7 provide a positive locking means for limiting a lateral movement of the seat cushion pan with an improved energy transfer by transmitting energy to the normal bending area of the cross tube 6 to create a more controlled bending or displacement of the cross tube 6 without a change in the material grain structure and a weakening of the cross tube material.

Basically, only one retaining feature between the cross tube 6 and the seat part mounting bracket 7 is necessary for limiting a lateral movement of the seat cushion pan. However, for safety reasons a second retaining feature at the opposite end of the cross tube 6 providing a second local bead in cooperation with an indentation or slot of a second seat part mounting bracket might be advantageous.

Figure 9:
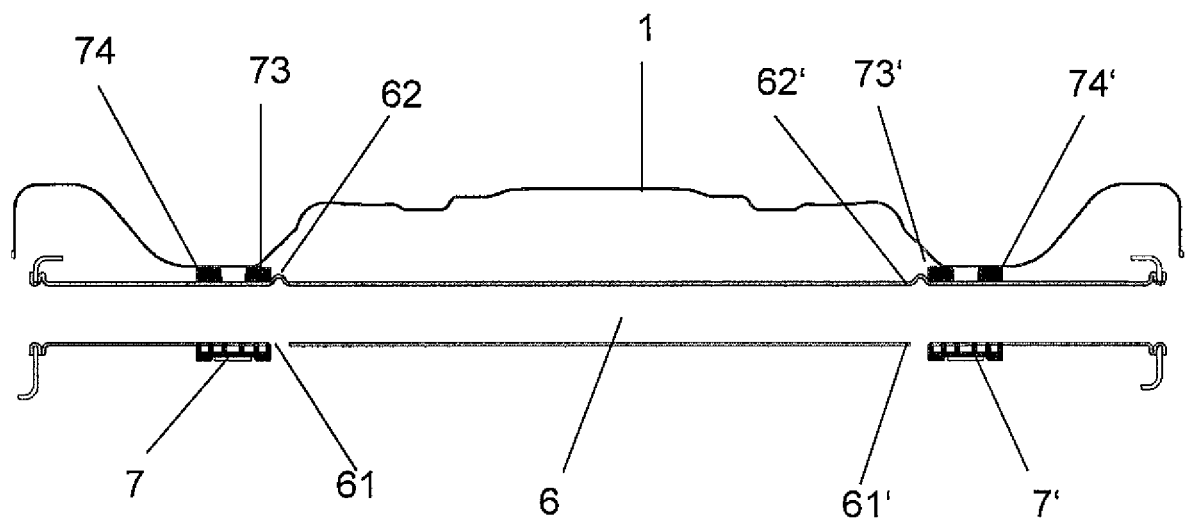
FIG. 9 a cross-sectional view of a positive locking retaining feature for limiting the lateral movement of the seat cushion pan by an abutment of inner edges of two seat part mounting bracket at two local beads of the cross tube being separated from each other in a predetermined distance.

A second retaining feature between the cross tube 6 and seat part mounting brackets 7, 7 is necessary in case of an embodiment of the present invention depicted in FIG. 9.

In this embodiment the cross tube 6 has two clearance openings 61, 61' within the range of two seat part mounting brackets 7, 7' being separated from each other in a predetermined distance such that the inner edges 73, 73' of the two seat part mounting brackets 7, 7' facing each other abut the two local beads 62, 62' of the cross tube 6. Due to the abutment of the inner edges 73, 73' of the two seat part mounting brackets 7, 7' against the double local beads 62, 62' of the cross tube 6 a lateral movement of the seat cushion pan is limited as well.

Alternatively the local beads 62, 62' of the cross tube 6 abut the outer edges 74, 74' of the two seat part mounting brackets 7, 7' which are oriented to the ends of the cross tube 6 or the side parts of the seat part, respectively.

Figure 10:
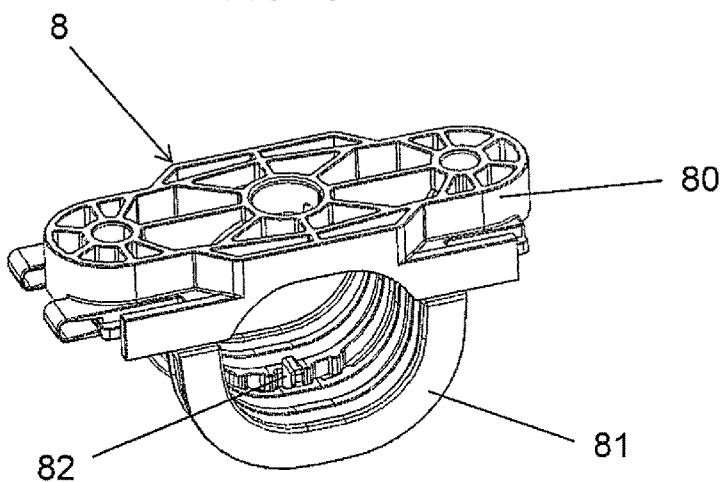
FIG. 10 a perspective view of a seat part mounting bracket comprising a cam-like embossment expanding from a tube enveloping part of the seat part mounting bracket engaging a mounting opening in the bottom of a cross tube.
Figure 11:
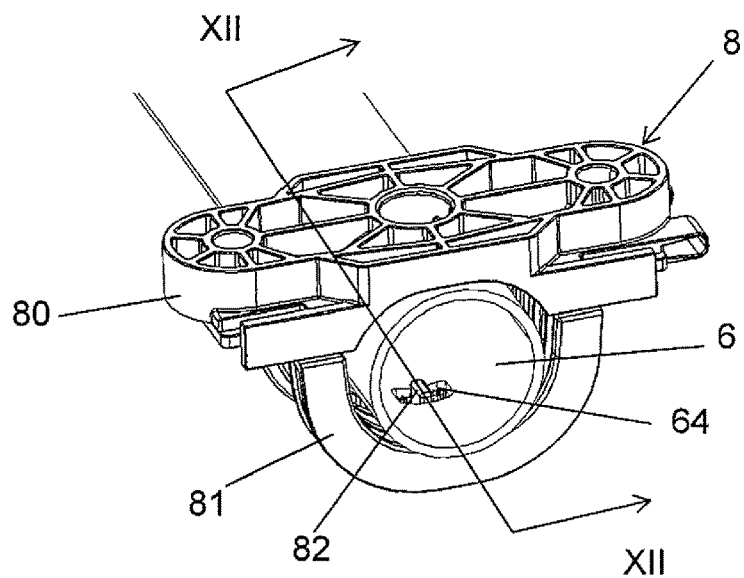
FIG. 11 a perspective partial view of the connection between the seat part mounting bracket according to FIG. 10 and the cross tube.
Figure 12:
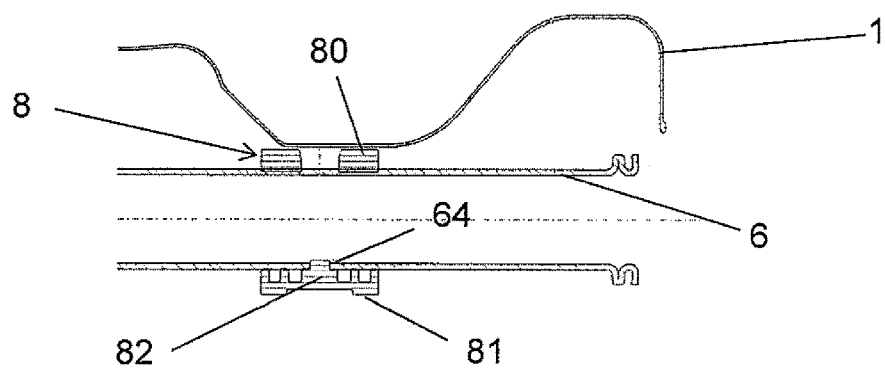
FIG. 12 a cross-sectional view, in the direction referenced XII-XII in FIG. 11.

FIGS. 10 to 12 show a further embodiment of the present invention wherein the positive locking between the cross tube 6 and the seat part mounting bracket 7 for limiting a lateral movement of the seat cushion pan is effected by a replacement of the retaining features.

FIG. 10 shows a perspective view of a seat part mounting bracket 8 comprising a mounting part 80 to be connected to the lower side of the seat cushion pan 1 and a tube enveloping part 81 covering the hollow-cylindrical main section 60 of the cross tube 6. A cam-like embossment 82 expands from the inner surface of the tube enveloping part 81 of the seat part mounting bracket 8 opposite the mounting part 80 of the seat part mounting bracket 8.

FIG. 11 shows in a perspective partial view and FIG. 12 in a cross-sectional view, in the direction referenced XII-XII in FIG. 11 the connection between the seat part mounting bracket 8 according to FIG. 10 and a cross tube 6 which comprises a mounting opening 64 formed as a slot punched into the bottom of the cross tube 6 with respect to the vertical direction or "Z"-direction of the Cartesian car coordinate system. The mounting opening 64 in this embodiment replaces the clearance opening 61 of the embodiment shown in FIGS. 5 to 8 and receives the cam-like embossment 82 of the seat part mounting bracket 8 with low tolerance in the "Y"-direction and clearance in the "X"-direction to allow a rotating cross tube 6.

Figure 13:
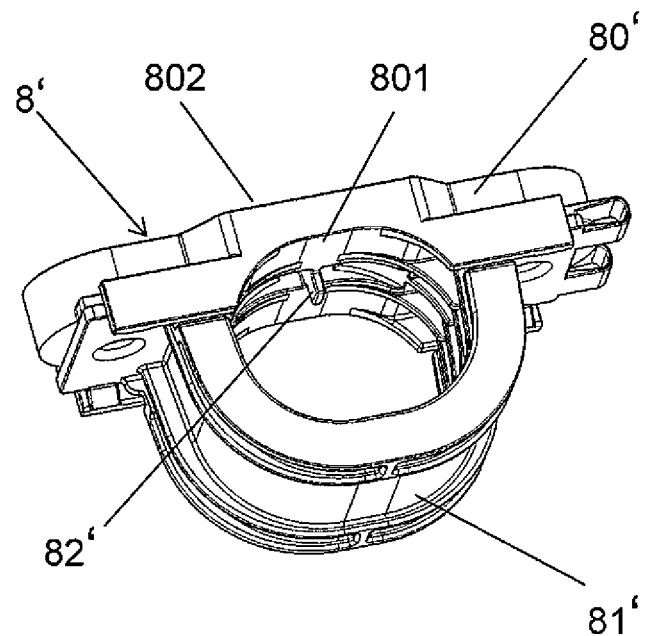
FIG. 13 a perspective view of a seat part mounting bracket comprising a cam-like embossment expanding from the lower surface of a mounting part of the seat part mounting bracket.
Figure 14:
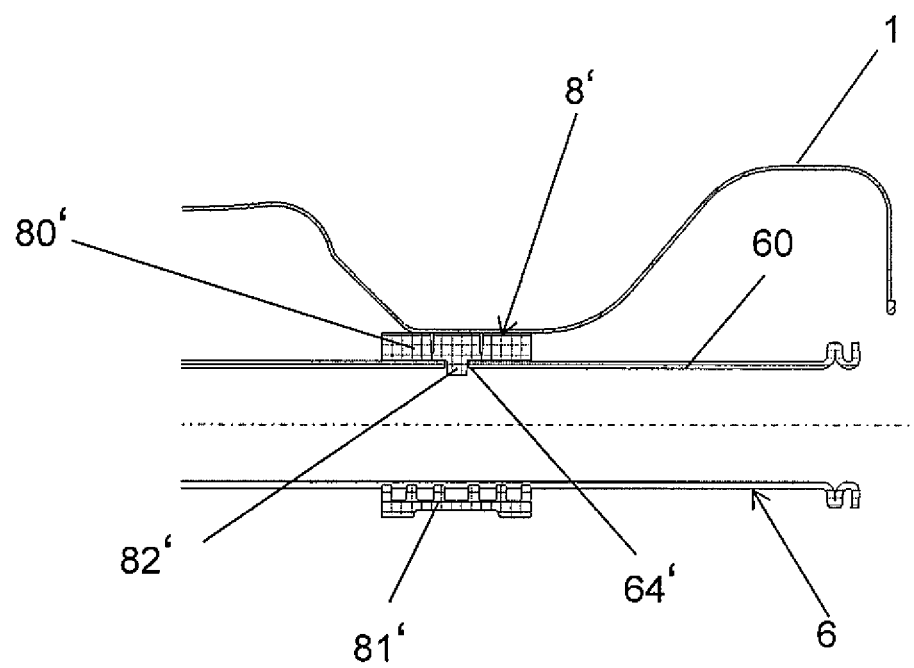
FIG. 14 a cross-sectional view of the connection between the seat part mounting bracket according to FIG. 13 and the cross tube wherein the cam-like embossment expanding from the lower surface of the mounting part of the seat part mounting bracket engages the mounting opening in the top side of the cross tube.

The positive locking principle between the cross tube 6 and the seat part mounting bracket 8 for limiting a lateral movement of the seat cushion pan of the embodiment according to FIGS. 10 to 12 can also apply to a mounting opening 64' in the top side of the cross tube 6 and a corresponding cam-like embossment 82' of a modified seat part mounting bracket 8' as shown in FIGS. 13 and 14.

FIG. 13 shows a perspective view of the modified seat part mounting bracket 8' comprising a mounting part 80' to be connected to the lower side of the seat cushion pan 1 and a tube enveloping part 81' covering the hollow-cylindrical main section 60 of the cross tube 6. A cam-like embossment 82' expands from the lower surface 801 of the tube enveloping part 81' of the seat part mounting bracket 8' opposite the upper surface 802 of the seat part mounting bracket 8 which is to be connected to the lower side of the seat cushion pan 1.

FIG. 14 shows in a cross-sectional view the connection between the modified seat part mounting bracket 8' according to FIG. 13 and the cross tube 6 which comprises a mounting opening 64' formed as a slot punched into the top side of the hollow-cylindrical main section 60 of the cross tube 6 with respect to the vertical direction or "Z"-direction of the Cartesian car coordinate system. The mounting opening 64' receives the cam-like embossment 82' of the modified seat part mounting bracket 8' with low tolerance in the "Y"-direction and clearance in the "X"-direction to allow a rotating cross tube 6.

Though only one retaining feature between the cross tube 6 and the seat part mounting bracket 7, 8, 8' is necessary for limiting a lateral movement of the seat cushion pan 1 two retaining features might be necessary not only in the case of a positive locking means as shown in FIG. 9 but also for safety reasons or symmetrical arrangement of the retaining features at both sides of the cross tube 6.

Figure 15:
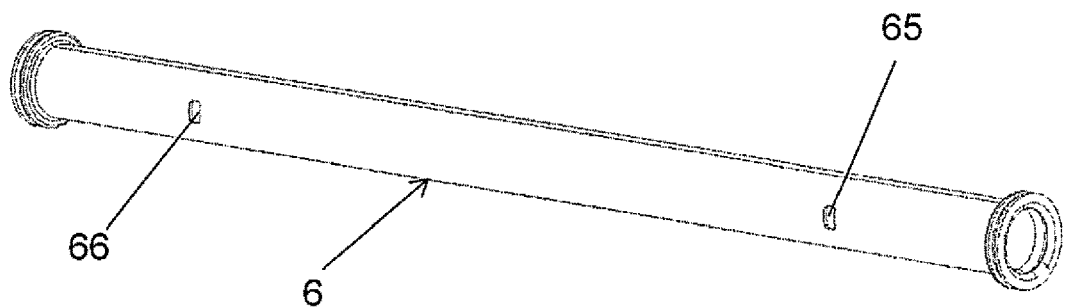
FIG. 15 a perspective view of a cross tube comprising two mounting openings for receiving a cam-like embossment of a seat part mounting bracket.

FIG. 15 shows a perspective view of a cross tube 6 comprising two mounting openings 65, 66 separated from each other in a predetermined distance for receiving cam-like embossments of two seat part mounting brackets formed as the seat part mounting bracket 8 shown in FIGS. 10 to 14.

Figure 16:
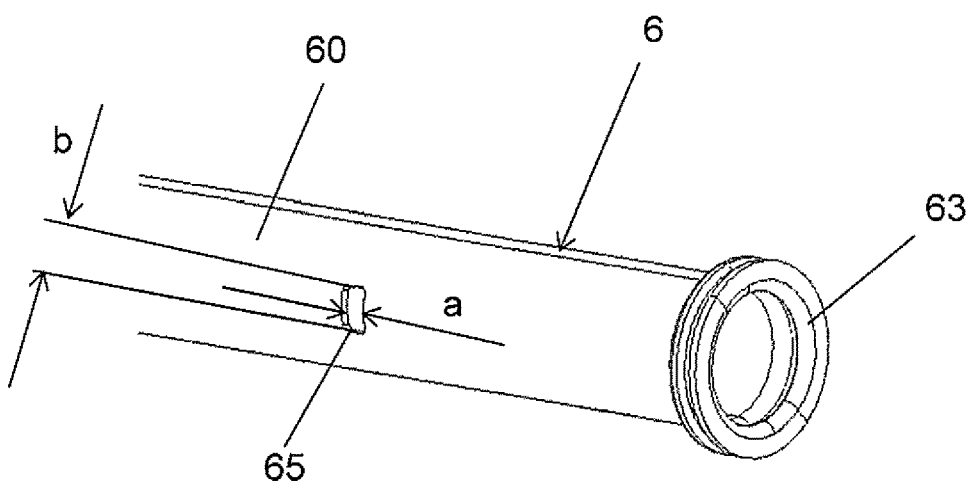
FIG. 16 a perspective view of a cross tube comprising a mounting opening with low tolerance in the "Y"-direction and clearance in the "X"-direction to allow a rotating tube and FIG. 17 a perspective partial view of the connection between the cross tube according to FIG. 14 and a rotating side part or rocket of a vehicle seat part.
Figure 17:
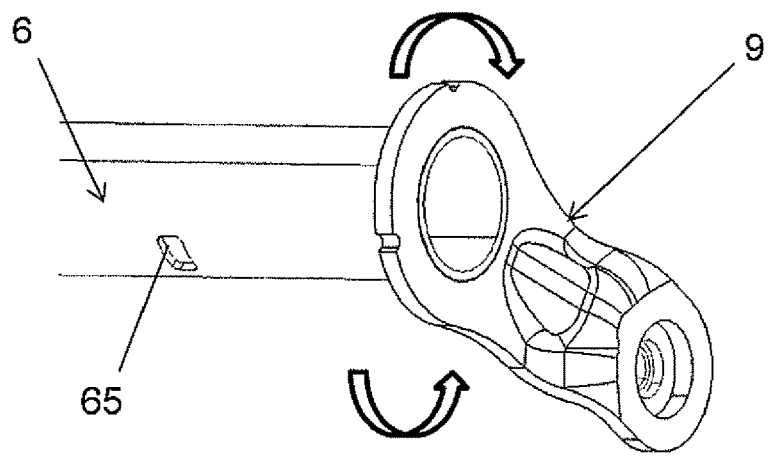

The mounting openings 65, 66 of the cross tube 6 according to FIG. 15 and the mounting opening 65 in the hollow-cylindrical main section 60 of the cross tube 6 according to FIG. 16 comprise a mounting opening with low tolerance in the "Y"-direction and clearance in the "X"-direction to limit a lateral movement of the seat part mounting brackets 7, 8 on one side and to allow a rotating cross tube 6 on the other side. This is effected by an axial width "a" of the mounting opening 65 corresponding to the width of the embossment 82 engaging the mounting opening 65 and a radial length "b" of the mounting opening 65 corresponding to the required rotation of the cross tube 6 as indicated by the arrows "B" and "C" of FIG. 17 which shows a perspective partial view of the connection between the cross tube 8 according to FIG. 16 and a rotating side part or rocket 9 of a vehicle seat part.

The embodiment described herein is not limiting for the invention as set forth in the claims, but merely provide illustrative examples. The invention can be carried out in an entirely different manner in entirely different embodiments.

REFERENCE NUMERALS 1 seat cushion pan
3 front cross tube
4, 5 seat part mounting brackets
6 cross tube
7, 8, 8' seat part mounting bracket
9 rotating side part or rocket
21,22 side parts
30 annular bead
40 ribs
41 annular groove
60 hollow-cylindrical main section
61 clearance opening
62 local bead
63 annular stops
64-66 mounting opening
64' top side mounting opening
70 mounting part
71 tube enveloping part
72 indentation or slot 73 inner edges
74 outer edges
80, 80' mounting part
81, 81' tube enveloping part
82, 82' cam-like embossment
a axial width of the mounting opening
b radial length of the mounting opening

The invention claimed is:

1. A vehicle seat comprising:
 a seat part comprising a seat cushion pan for a seat occupant and two side parts between which a cross tube having a substantially cylindrical surface extends along a pivot axis,
 seat part mounting brackets for connecting said seat cushion pan and said cross tube,
 said cross tube having a clearance opening in its cylindrical surface in a connecting section of at least a first mounting bracket said seat part mounting brackets and a cam opposite from said clearance opening,
 said cam positively engaging a lock of said first mounting bracket for limiting a lateral movement of said seat cushion pan.

2. The vehicle seat of claim 1, wherein said clearance opening is formed as a hole or slot punched into a bottom of the cylindrical surface of said cross tube with respect to a Z direction of the Cartesian car coordinate system) to provide access to a tool to create said cam opposite from said clearance opening.

3. The vehicle seat of claim 2, wherein said cam is formed on an opposite side on top of the cylindrical surface of said cross tube with respect to the Z direction of the Cartesian car coordinate system.

4. The vehicle seat of claim 1, wherein said cam radially expands from the cylindrical surface of said cross tube.

5. The vehicle seat of claim 1, wherein the lock which said cam engages is an indentation or slot within the surface of said seat part mounting bracket facing said cross tube.

6. The vehicle seat of claim 1, wherein said cross tube has an additional clearance opening in its cylindrical surface in the connecting section of a second seat part mounting bracket being separated from the first seat part mounting bracket by a predetermined distance and cams opposite from said clearance openings, said cams abutting inner edges of said first and second seat part mounting brackets facing each other.

7. The vehicle seat of claim 1, wherein said cross tube has an additional clearance opening in its cylindrical surface in a connecting section of a second seat part mounting bracket being separated from said first seat part mounting bracket by a predetermined distance and cams opposite from said clearance openings, said cams abutting outer edges of said first and second seat part mounting brackets being oriented to said side parts of said seat part.

8. The vehicle seat of claim 1, wherein said vehicle seat further comprises an adjustment mechanism including a plurality of rockers which are pivotally coupled to said seat part and which are connected in a torsionally locked manner to said cross tube.

9. A vehicle seat comprising:
 a seat part comprising a seat cushion pan for a seat occupant and two side parts between which a cross tube extends along a pivot axis,
 seat part mounting brackets for connecting said seat cushion pan and said cross tube,
 said cross tube having a mounting opening in a connecting section of at least one of said seat part mounting brackets,
 said at least one of said seat part mounting brackets in the connecting section of said mounting opening having a cam expanding from the inner surface of said at least one said seat part mounting brackets facing said mounting opening of said cross tube,
 said cam of said at least one of said seat part mounting brackets engaging said mounting opening of said cross tube for limiting a lateral movement of said seat cushion pan.

10. The vehicle seat of claim 9, wherein said mounting opening is formed as a hole or slot punched into the bottom of said cross tube with respect to a Z-direction of the Cartesian car coordinate system, said at least one of said seat part mounting brackets in the connecting section of said mounting opening having a mounting part opposite said cam for connecting said seat cushion pan to said at least one of said seat part mounting brackets.

11. The vehicle seat of claim 9, wherein said mounting opening is formed as a hole or slot punched into the top side of said cross tube with respect to the Z-direction of the Cartesian car coordinate system, said at least one of said seat part mounting brackets in the connecting section of said mounting opening having a cam expanding from the lower surface of the mounting part of said at least one of said seat part mounting brackets facing said mounting opening of said cross tube.

12. The vehicle seat of claim 9, wherein said vehicle seat further comprises an adjustment mechanism including a plurality of rockers which are pivotally coupled to said seat part and which are connected in a torsionally locked manner to said cross tube.

* * * * *

UNITED STATES PATENT AND TRADEMARK OFFICE
CERTIFICATE OF CORRECTION

PATENT NO. : 10,562,422 B2  Page 1 of 1
APPLICATION NO. : 15/427717
DATED : February 18, 2020
INVENTOR(S) : Leo Ioppolo It is certified that error appears in the above-identified patent and that said Letters Patent is hereby corrected as shown below:

In the Claims

Column 7, Line 18, Claim 1    delete "bracket" and insert -- bracket of --

Column 7, Line 25, Claim 2    delete "Z" and insert -- Z- --

Column 7, Line 26, Claim 2    delete "system)" and insert -- system --

Column 7, Line 31, Claim 3    delete "Z" and insert -- Z- --

Signed and Sealed this
Fifth Day of January, 2021

Andrei Iancu
*Director of the United States Patent and Trademark Office*